United States Patent
Wood et al.

(10) Patent No.: US 11,109,950 B2
(45) Date of Patent: Sep. 7, 2021

(54) COMBINATION ELECTRIC TOOTHBRUSH AND WATER IRRIGATION DEVICE

(71) Applicants: Robert Wood, Marina Del Rey, CA (US); Jason Bland, Baker City, OR (US); Kenneth A. Tarlow, San Rafael, CA (US)

(72) Inventors: Robert Wood, Marina Del Rey, CA (US); Jason Bland, Baker City, OR (US); Kenneth A. Tarlow, San Rafael, CA (US)

( * ) Notice: Subject to any disclaimer, the term of this patent is extended or adjusted under 35 U.S.C. 154(b) by 193 days.

(21) Appl. No.: 16/235,928

(22) Filed: Dec. 28, 2018

(65) Prior Publication Data

US 2020/0205949 A1 Jul. 2, 2020

(51) Int. Cl.
| | |
|---|---|
| *A61C 17/02* | (2006.01) |
| *A61C 17/28* | (2006.01) |
| *A46B 15/00* | (2006.01) |
| *A46B 9/04* | (2006.01) |
| *A46B 11/00* | (2006.01) |
| *A46B 5/00* | (2006.01) |

(52) U.S. Cl.
CPC ............ *A61C 17/0202* (2013.01); *A46B 9/04* (2013.01); *A46B 11/001* (2013.01); *A46B 15/0036* (2013.01); *A61C 17/28* (2013.01); *A46B 5/0095* (2013.01); *A46B 2200/1066* (2013.01)

(58) Field of Classification Search
CPC ..... A61C 17/0202; A61C 17/28; A61C 17/02; A46B 5/0095; A46B 15/0036; A46B 11/001; A46B 9/04; A46B 2200/1066
See application file for complete search history.

(56) References Cited

U.S. PATENT DOCUMENTS

| | | | |
|---|---|---|---|
| 2008/0060148 A1* | 3/2008 | Pinyayev | A61B 5/415 15/22.1 |
| 2008/0209650 A1* | 9/2008 | Brewer | A61C 17/221 15/22.1 |
| 2009/0070949 A1* | 3/2009 | Sagel | A46B 11/0058 15/28 |
| 2014/0090192 A1* | 4/2014 | Amron | A46B 11/00 15/22.1 |
| 2014/0259474 A1* | 9/2014 | Sokol | A61C 17/3418 15/22.2 |
| 2014/0352088 A1* | 12/2014 | Wu | A61C 17/3436 15/22.1 |

(Continued)

*Primary Examiner* — Quang D Thanh
(74) *Attorney, Agent, or Firm* — Savantek Patent Services; Ivan E. Rozek

(57) ABSTRACT

A combination electric toothbrush and water irrigation device that combines a battery powered water irrigation device with a vibrating electric toothbrush, both of which are housed in a self-contained compact hand-held device. The pump for the water irrigation device and the DC motor with an off-center weight are contained within the handle of the toothbrush. A slide out water reservoir allows the user to fill the extended handle portion with water. A flexible water inlet tube is capable of compressing when the water reservoir is in the storage position. A weight fixed to the end of the inlet tube causes the tube to bend via gravity enabling it to be in constant contact with water while the handle is held at various angles. An LED at the underside of the pump housing illuminates the water contained within the transparent water housing.

3 Claims, 5 Drawing Sheets

(56) References Cited

U.S. PATENT DOCUMENTS

| | | | | |
|---|---|---|---|---|
| 2016/0331116 A1* | 11/2016 | Follows | ................... | A46B 9/04 |
| 2018/0110601 A1* | 4/2018 | Mighall | ............. | A46B 15/0044 |
| 2018/0177575 A1* | 6/2018 | Yoshida | ............. | A61C 17/3481 |
| 2018/0271267 A1* | 9/2018 | Velasquez | ............ | A46B 11/002 |
| 2018/0289456 A1* | 10/2018 | Follows | ............... | A61C 1/0061 |

* cited by examiner

COMBINATION ELECTRIC TOOTHBRUSH AND WATER IRRIGATION DEVICE

CROSS REFERENCE TO RELATED APPLICATIONS

Not Applicable

STATEMENT REGARDING FEDERALLY SPONSORED RESEARCH OR DEVELOPMENT

Not Applicable
Description of Attached Appendix
Not Applicable

BACKGROUND OF THE INVENTION

This invention relates generally to the field of teeth and gum cleaning devices and more specifically to a combination electric toothbrush and water irrigation device that is compact, portable and can be held in one hand during use.

Teeth cleaning devices have been used for hundreds of years and are essential to successful oral hygiene. A well-known method of cleaning teeth is the use of an electric toothbrush including rotary brush design and a vibrating brush design. Another well-known method of cleaning teeth and gums is the use of an oral irrigator such as the Waterpik device that pumps water from a reservoir to an exit tube that is held by the user to blast water onto teeth and gums to remove unwanted dental debris.

Although the use of both of these valuable teeth and gum cleaning tools exists today, the user must purchase and maintain and store two different products for cleaning teeth.

Additionally, the user does not have the option to use both the electric brushing feature and the water irrigation feature at the same time if so desired. Finally, the user has not had the ability to recharge the battery power supply of both the electric toothbrush and the water irrigation device at the same time.

BRIEF SUMMARY OF THE INVENTION

The primary object of the invention is to provide a single teeth cleaning device that includes both an electric toothbrush and a water irrigation device.

Another object of the invention is to provide an electric toothbrush and water irrigation device that is fully portable and can be easily held in one hand.

Another object of the invention is to provide an electric toothbrush and water irrigation device that can be recharged when placed on a recharging stand.

A further object of the invention is to provide an electric toothbrush and water irrigation device that can be used while being held at a variety of angles.

Yet another object of the invention is to provide an electric toothbrush and water irrigation device where the user can select the use of one function or both functions at same time.

Still yet another object of the invention is to provide an electric toothbrush and water irrigation device that allows the user to easily remove and replace both the water irrigation tube and the toothbrush head.

Another object of the invention is to provide an electric toothbrush and water irrigation device that includes a light emitting diode display that illuminates the water storage compartment during use.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a combination electric toothbrush and water irrigation device comprising: a water reservoir housing, a water pump, a pump housing and handle portion, a charging circuit, a battery power supply, a direct current motor with an off-center weight, a brush neck, a brush head, a water exit tube, a water inlet tube with a weight, a charging stand, a pump on-off switch, a vibrator on-off switch, a light emitting diode illuminating device, the water reservoir housing walls slidably engaged with the outer walls of the housing and handle portion, the water pump housed within the pump housing and handle portion, the charging circuit, the pump on-off switch and battery power supply also housed within the pump housing and handle portion, said off center the off-center weight is attached to the shaft of the direct current motor, the direct current motor and weight housed within said brush neck the hollow portion, the battery power supply attached to the pump and the vibrating brush motor, the vibrator on-off switch housed within the brush neck, the brush head attached to the top of the brush neck, the brush head including comprising an aperture for receiving the end of the exit tube, the brush neck and the water exit tube capable of being removably replaced, a water discharge tube extending from the water pump to the top portion of the brush head, the water inlet tube terminating at its distal end in the inlet tube weight member, the water inlet tube attached at its proximal end to the water inlet of the water pump, the charging stand including an elongate portion that contains a portion of a charging circuit that aligns with the location of the the charging circuit located within the pump housing and handle portion, the light emitting diode illuminating device capable of illuminating the water in the water reservoir housing.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE DRAWINGS AND PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
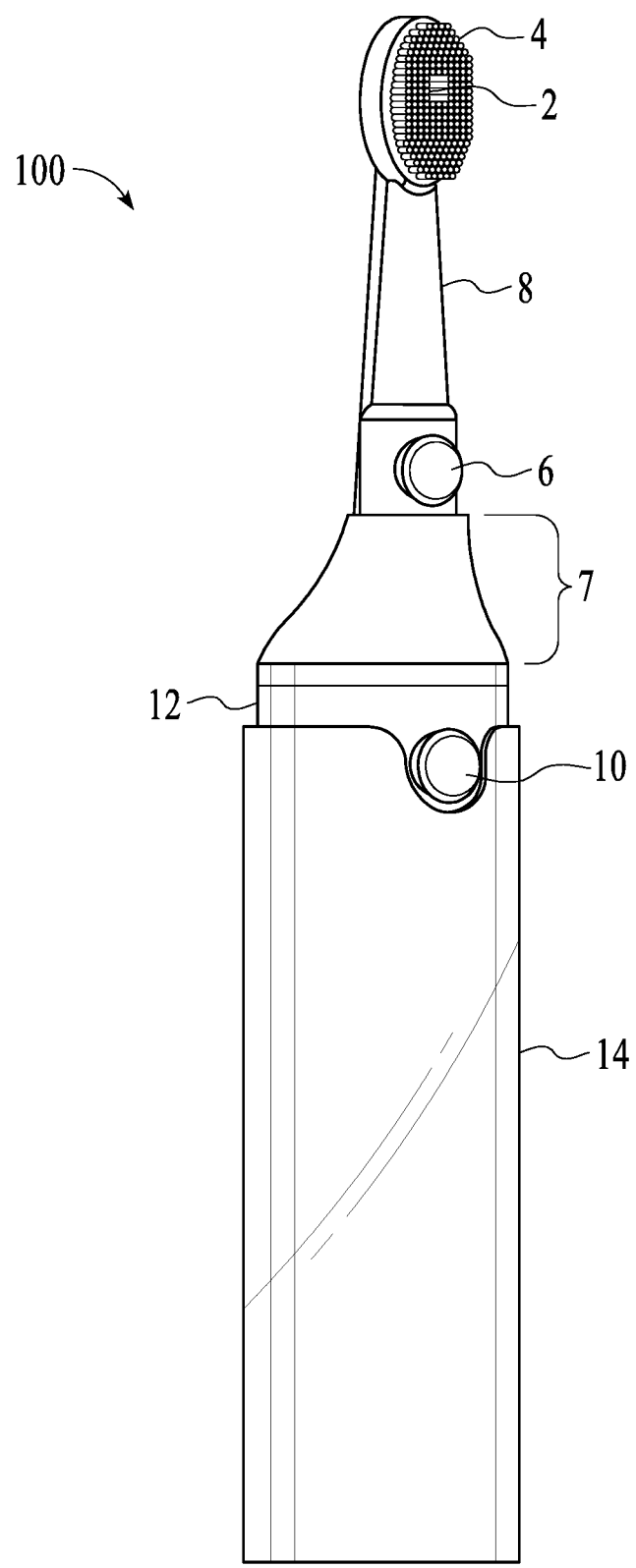
FIG. 1 is a front view of the invention.

Referring now to FIG. 1 we see a perspective front view of the embodiment 100 in a compact configuration preferred for transport and storage. A transparent water housing 14 is slidably placed over a pump housing and handle portion 12.

The hollow portion 7 just above of the pump housing and handle portion 12 retains a direct current motor 38 that, when turned on by an on-off switch 6, causes a vibrateable brush neck member 8 and a vibrateable brush head 4 to vibrate which significantly improves the effectiveness of the brush 4 during teeth cleaning activity. A second on-off switch 10 controls a water pump 26 located within the pump housing and handle portion 12 which causes water to be forced out of aperture 2 within brush head 4 when switched on, as will be described in detail below.

Figure 2:
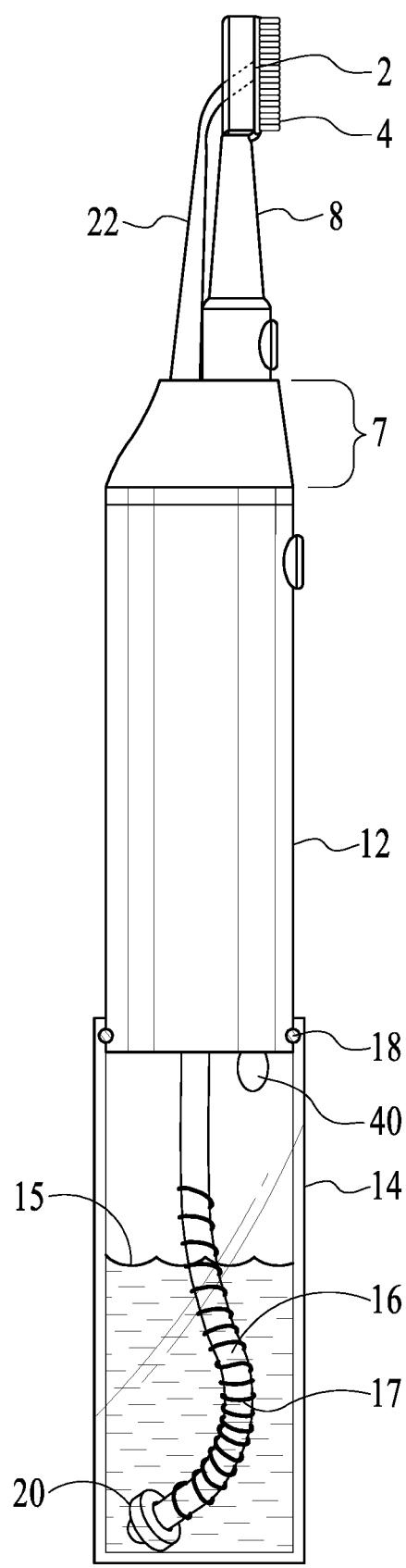
FIG. 2 is a side view of the invention.

FIG. 2 is a side view of the invention with the water reservoir housing 14 slid down so that it can hold water 15 that will be used for oral irrigation purposes. A flexible inlet tube 16 includes a weight 20 at the inlet tube distal end, that causes the distal end of the Het tube to move via gravity as the angle of the brush handle 12 changes during use. A spiral spring member 17 surrounds the inlet tube 16 to help prevent it from crimping when in a compact position. Weight 20 ensures that the inlet tube 16 is always in position to accept water 15. In this way, the inlet tube 16 can use all of the stored water 15 no matter what the angle of the pump housing and handle portion 12 and water reservoir 14. The side view also shows a water outlet tube 22 that transfers pressurized water to its exit port 2 that is located just above brush bristles 4. Water-tight gasket 18 traps the water 15 in the reservoir 14 from spilling out and also acts as a frictional force to cause the water reservoir 14 to remain in place during use whether in the use position or in the storage position.

Figure 3:
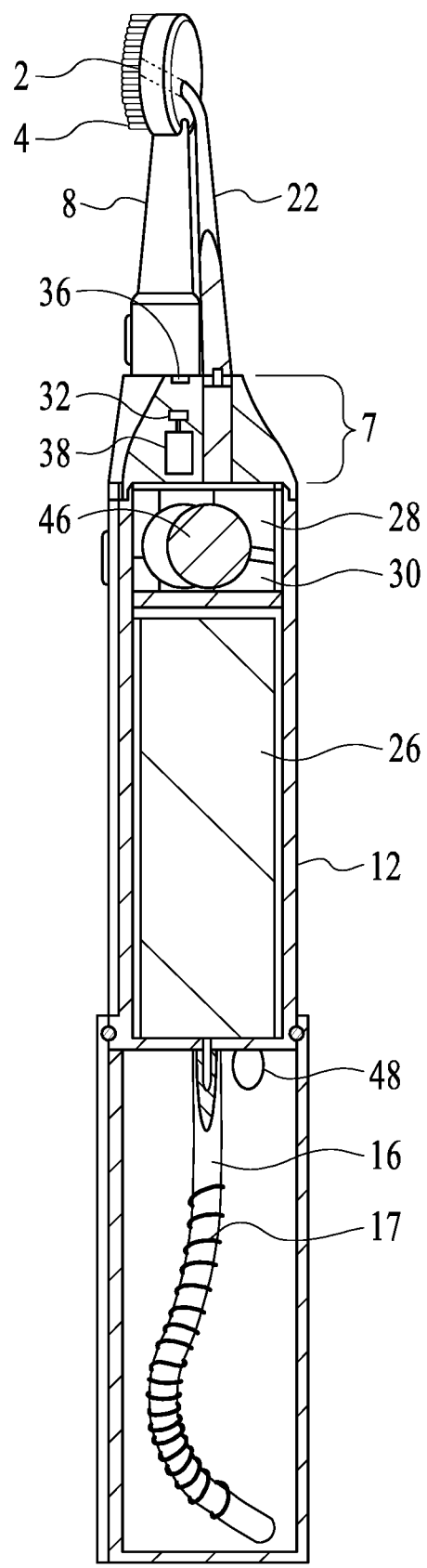
FIG. 3 is a side section view of the invention.

FIG. 3 is a side section view of the invention. Motor driven pump 26 can be seen inside the pump housing and handle portion 12. The upper area of the pump housing and handle portion 12 contains a rechargeable battery 28 and a charging circuit 30. The hollow space 7 between the pump housing and handle portion 12 and the brush neck 8 contains a direct current motor 38 with an off-center weight 32 attached to its shaft. The vibration generated by the motor and weight cause the bristles of brush 4 to vibrate in a way that helps the brush remove tartar and other unwanted debris from the user's teeth. The cleaning results are superior in comparison to using a manual brush that does not vibrate. The vibrating solution takes up significantly less space than other electrically powered bristle moving devices that are currently available, which makes it a superior solution for the present invention 100 which seeks to combine the use of electrically assisted animated bristles and an electrical pump assisted water irrigation device within in one compact handheld device. The charging electronics includes an electricity receiving coil 46 that lets power be transferred from a charging coil 24 located within charging station 50 and through the side wall of the pump housing and handle portion 12. In this way, the charging of the battery 28 that powers both the pump motor 26 and the vibration generating motor 38 can be accomplished in a water-proof manner. A light emitting diode 48 located just below pump 26 points downward into water chamber creating an attractive color changing pattern during use.

Figure 4:
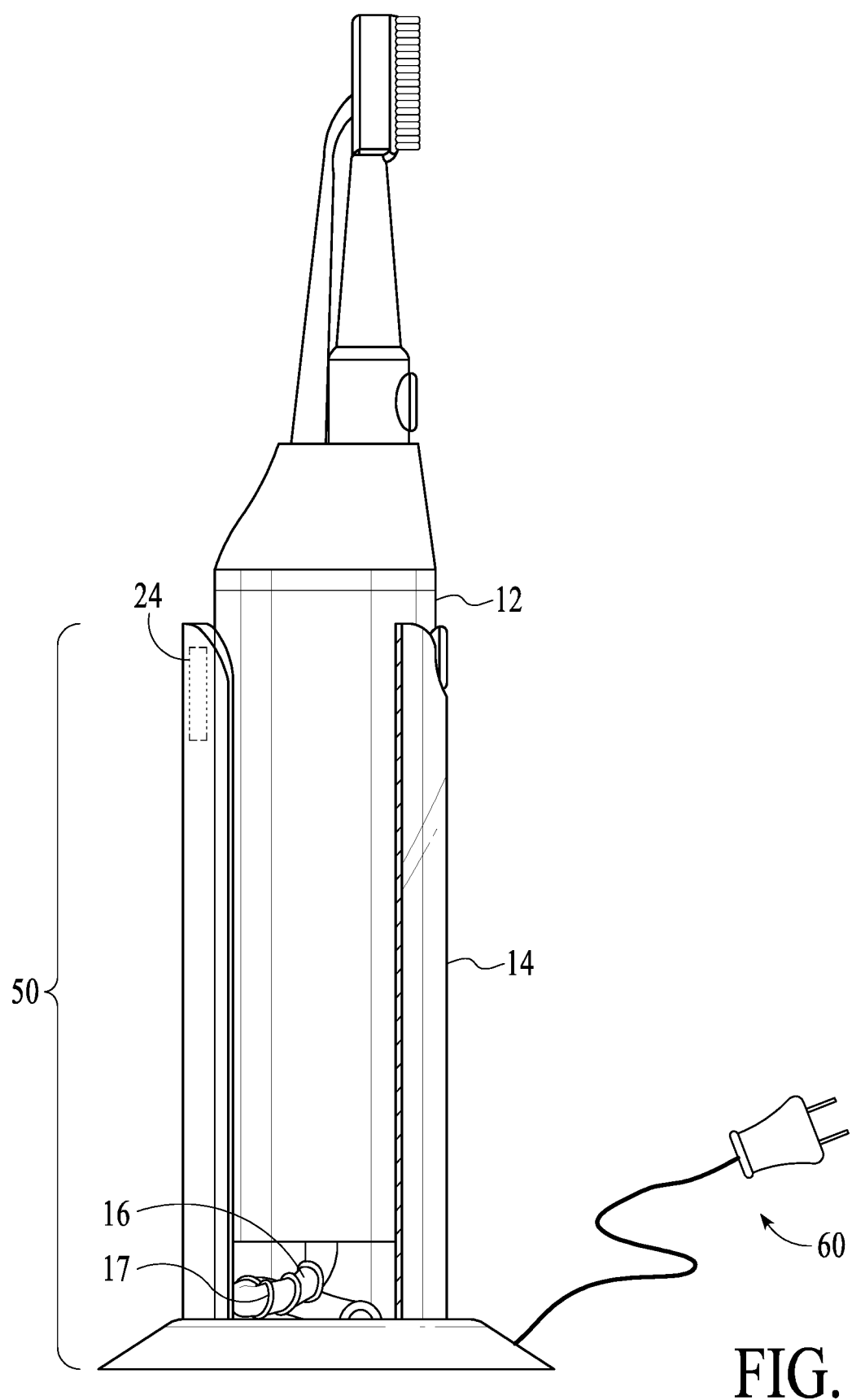
FIG. 4 is a side view of the invention in its charging stand.

FIG. 4 is a side view of the embodiment 100 showing it in place on charging stand 50. As mentioned above, an inductive coil shown by dotted line 24 transfers power from the charging stand 50 to the charging circuit 30 located within pump and handle housing 12. On-off switch 10 turns on or off the pump motor 26. On-off switch 6 turns on or off the vibration generating motor 38. The user has the option to turn on one or the other or both of the switches 6, 10 simultaneously so that both features can be used at the same time. An optional timer circuit can be installed within the pump housing and handle portion 12 that will automatically turn off the vibrating motor 38 after a fixed period of time. Additionally, a charging indicator light can be installed within the housing pump housing and handle portion 12 to let the user know when the battery needs to be charged. Power cord and plug 60 supplies power to the charging stand 50. This view also shows flexible inlet tube 16 in the folded position when in the stored position. The tube 16 can be prevented from permanently kinking by incorporating an external spring 17 as a sleeve surrounding the tube 16.

Figure 5:
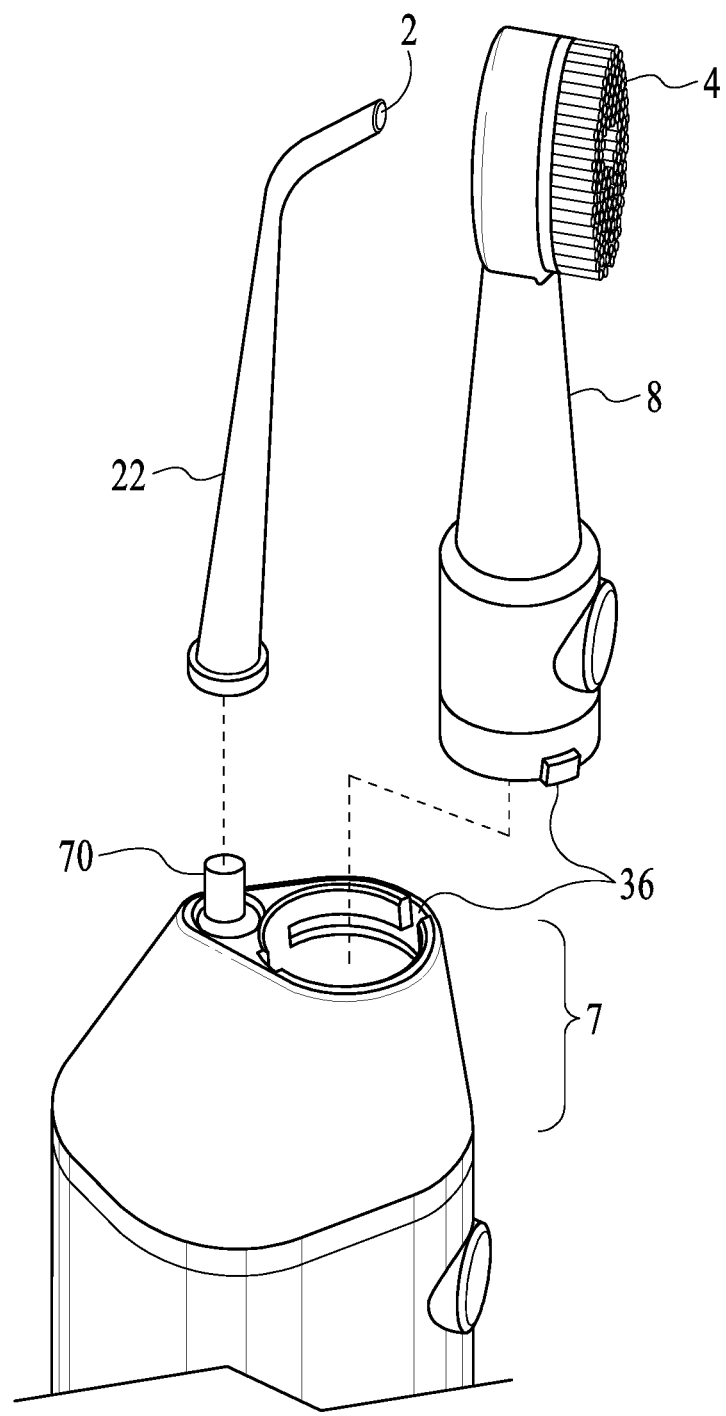
FIG. 5 is an exploded view of the brush head and neck of the invention.

FIG. 5 is an exploded view showing the connection point of exit tube 22 and brush neck 8. A male connector fitting port 70 engages the inside wall of exit tube 22. The tube 22 can be removed and replaced from the fitting port 70. Brush neck 8 can be removed via quarter turn connector joint, also known as bayonet type connection. In this way, the user can remove and replace both the exit tube 22 and the brush assembly 8, 4 so that other users can attach their own cleaning heads, or the cleaning head can be replaced after extended use.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A compact portable combination oral hygiene device combining an electric toothbrush and a water irrigator, the combination oral hygiene device comprising:
   (a) a pump housing and handle portion, the pump housing and handle portion comprising a bottom, a top, an inner wall, and an outer wall;
   (b) a water exit tube comprising an exit port end and a connection fitting port end;
   (c) a brush assembly composed of a brush head and a brush neck, the brush head comprising an aperture, wherein the exit port end is located in the brush head aperture for dental irrigation wherein the irrigation is activated by a user by a switch provided on the pump housing and handle portion;
   (d) a hollow portion above the pump housing and handle portion comprising connection means for removably attaching the brush assembly and the water exit tube to the hollow portion, wherein the connection means comprises a quarter turn brush neck connector joint and a fitting exit tube male connector; the hollow portion furthermore comprising a direct current vibration generating motor having an off-center weight attached to a motor shaft, wherein the off-center weight causes vibrations to the motor shaft, wherein furthermore the brush neck and the brush head are vibrated by the motor shaft vibrations, wherein the direct current vibration generating motor is controlled independently of the water irrigator by a dedicated switch located on the brush neck;
   (e) a water reservoir housing, comprising an open top, a closed bottom, an inner wall, an outer wall, and a gasket at the water reservoir housing top; the pump housing and handle portion slidably inserted into the water reservoir housing through the gasket, wherein the gasket provides a water-tight seal between the water reservoir housing inner wall and the pump housing and handle portion outer wall, thereby providing for a slidably variable length and variable volume no-spill water container; and
   (f) a charging stand.

2. The combination oral hygiene device of claim 1, wherein the water irrigator comprises: water pump housed in the pump housing and handle portion; an inlet tube having a weighted intake end located in the water reservoir housing and a pump connection end connected to the water pump; the water exit tube removably connected to the fitting exit tube male connector providing a watertight connection to the water pump; and the water pump being controlled by the switch provided on the pump housing and handle portion.

3. The combination oral hygiene device of claim 1, wherein the oral hygiene device is used as a toothbrush, as an irrigator, or as a toothbrush and irrigator combination.

\* \* \* \* \*